(12) United States Patent
Takamoto

(10) Patent No.: US 9,001,342 B2
(45) Date of Patent: Apr. 7, 2015

(54) POS SYSTEM, POS SYSTEM CONTROL METHOD, AND RECORDING MEDIA PROCESSING SYSTEM

(75) Inventor: Akio Takamoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/812,812

(22) PCT Filed: Feb. 20, 2012

(86) PCT No.: PCT/JP2012/054682
§ 371 (c)(1),
(2), (4) Date: Jan. 28, 2013

(87) PCT Pub. No.: WO2012/117984
PCT Pub. Date: Sep. 7, 2012

(65) Prior Publication Data
US 2013/0128300 A1    May 23, 2013

(30) Foreign Application Priority Data

Mar. 2, 2011  (JP) .................. 2011-044615

(51) Int. Cl.
*G06F 15/00* (2006.01)
*G06F 3/12* (2006.01)
*G06K 1/00* (2006.01)
*H04N 1/00* (2006.01)
*G06F 9/455* (2006.01)

(52) U.S. Cl.
CPC .................. *H04N 1/00* (2013.01); *G06F 9/455* (2013.01); *H04N 1/00323* (2013.01); *H04N 1/00344* (2013.01); *G06F 3/1206* (2013.01); *G06F 3/1247* (2013.01); *G06F 3/1284* (2013.01); *H04N 2201/0024* (2013.01); *G06F 3/1236* (2013.01)

(58) Field of Classification Search
CPC ..... G06F 13/10; G06F 13/105; G06F 3/1206; G06F 3/1247; G06F 3/1284; G06F 3/1236; H04N 1/00; H04N 1/00323; H04N 1/00344
USPC ................................. 358/1.1, 1.15, 1.13, 1.14
See application file for complete search history.

(56) References Cited

U.S. PATENT DOCUMENTS

| 5,678,059 A | 10/1997 | Ramaswamy et al. |
| 6,263,384 B1 | 7/2001 | Yanase |
| 2008/0005388 A1* | 1/2008 | Hara ............................... 710/22 |

FOREIGN PATENT DOCUMENTS

| JP | 08-069427 | 3/1996 |
| JP | 11-134272 | 5/1999 |
| JP | 2003-108509 | 4/2003 |
| JP | 2005-267230 | 9/2005 |
| JP | 2006-031607 | 2/2006 |
| JP | 2006-323463 | 11/2006 |
| JP | 2006-338443 | 12/2006 |
| JP | 2009-226689 | 10/2009 |

\* cited by examiner

*Primary Examiner* — Douglas Tran

(57) ABSTRACT

A host device includes an application unit that outputs a first command or a second command, a receiving unit that receives the output first command or second command, a command control unit that converts the received first command to a third command, and converts the second command to a fourth command, and a host communication unit that transmits the converted third command or fourth command. A device includes a device reception unit that receives the third command or fourth command, a first operating unit that performs the first operation based on the third command, and a second operating unit that receives the fourth command and performs the second operation.

18 Claims, 4 Drawing Sheets

POS SYSTEM, POS SYSTEM CONTROL METHOD, AND RECORDING MEDIA PROCESSING SYSTEM

TECHNICAL FIELD

The present invention relates to a POS control method for replacing a plurality of devices that operate according to commands output from an application with a single multi-function device, and relates more particularly to a POS system that enables easily replacing a device without changing the application program.

BACKGROUND ART

POS systems, which are a type of sales management system, are commonly used in the retail industry in supermarkets, for example. In such systems, plural terminal devices (registers) connected with a server over a network operate according to an application installed on each terminal device and perform various processes. A printer and other peripheral devices are normally disposed to each terminal device and perform such operations as outputting receipts and coupons and scanning checks as instructed by the application. Systems that are configured similarly to POS systems that produce such output include systems used in hospitals and systems used by shipping companies.

After such a business system that uses such peripheral devices is introduced, modifying the system by adding functions or replacing peripheral devices may be necessitated by improvements in technology and changing business needs. Accommodating such system improvements, however, often requires changing the application program.

However, because such systems are central to business operations and are in constant use, and are often connected to other systems in complex ways, modifying the application is usually not easy.

This need to change the application program has been addressed in various ways as described below.

Japanese Unexamined Patent Appl. Pub. JP-A-H08-69427, for example, describes a device that renders a modem function in a personal computer that enables eliminating the microprocessor and memory that are required in a conventional modem without needing to modify an existing application program.

Japanese Unexamined Patent Appl. Pub. JP-A-2006-338443 describes a device that can access one communication port and cause a printer connected to another communication port to print simultaneously so that duplicate copies can be printed without modifying the application.

CITATION LIST

Patent Literature

[PTL 1] Japanese Unexamined Patent Appl. Pub. JP-A-H08-69427
[PTL 2] Japanese Unexamined Patent Appl. Pub. JP-A-2006-338443

SUMMARY OF INVENTION

Technical Problem

Peripheral devices used in such systems increasingly include multifunction devices, which are single devices that perform a plurality of functions. Replacing plural existing peripheral devices with a single multifunction device is also a desirable upgrade for business systems such as described above.

The content of JP-A-H08-69427 and JP-A-2006-338443 described above relates to modem functions and duplicate printing functions, and does not solve the above problem of replacing peripheral devices. In addition, JP-A-2006-338443 relates to a process on the OS kernel layer, and does not generally enable easily adding new functions (including program development).

A program according to the invention enables easily combining the functions of and replacing a plurality of devices that operate according to commands output from an application with a single multifunction device without changing the application program.

Solution to Problem

To achieve the foregoing object, one aspect of the invention is a POS system having a host device including an application unit that outputs a first command that performs a first operation on a medium, or a second command that performs a second operation different from the first operation, a receiving unit that receives the first command or second command output by the application unit, a command control unit that converts the first command received by the receiving unit to a third command, and converts the second command to a fourth command, and a host communication unit that transmits the third command or fourth command output from the command control unit; and a device including a device communication unit that receives the third command or fourth command, a first operating unit that performs the first operation based on the third command, and a second operating unit that performs the second operation based on the fourth command.

In a POS system according to another aspect of the invention, the host device has a control unit with a kernel layer for an operating system and an application layer where the application executes; the receiving unit is a virtual port that is implemented on the kernel layer; and the command control unit operates on the application layer.

In a POS system according to another aspect of the invention, the command control unit adds first operation information to the third command when converting the first command, and adds second operation information to the fourth command when converting the second command.

In a POS system according to another aspect of the invention, the device includes a selection unit that selects the first operating unit based on the first operation information added to the third command, or selects the second operating unit based on the second operation information added to the fourth command.

In a POS system according to another aspect of the invention, the device communication unit sends a signal reporting the end of the first operation of the first operating unit based on the transmitted third command, or the end of the second operation of the second operating unit based on the transmitted fourth command; and the host communication unit receives the signal sent from the device communication unit.

In a POS system according to another aspect of the invention, the host communication unit does not send the fourth command to the device communication unit after sending the third command until the signal transmitted from the device communication unit is received.

In a POS system according to another aspect of the invention, when converting the first command to the third command, the command control unit changes and converts the first operation instruction contained in the first command to the third command.

In a POS system according to another aspect of the invention, the first operation is a printing operation that prints to the medium; the second operation is a reading operation that reads the medium; the first operating unit is a print unit that prints on the medium; and the second operating unit is a scanner unit that scans the medium.

In a POS system according to another aspect of the invention, the first operation is a printing operation that prints to roll paper; the second operation is a printing operation that prints to a slip; the first operating unit is a roll paper printing unit that prints on roll paper; and the second operating unit is a slip printing unit that prints on a slip.

A POS system according to another aspect of the invention preferably also has a POS server that manages the host device over a network.

Another aspect of the invention is a POS system control method, including steps of: an application outputting a first command that performs a first operation on a recording medium, or a second command that performs a second operation different from the first operation, receiving the output first command or second command, converting the first command to a third command when the first command is received, converting the second command to a fourth command when a second command is received, and transmitting the converted third command or fourth command output to a device; the device performing the first operation when the third command is received, and performing the second operation when the fourth command is received.

In a POS system control method according to another aspect of the invention, the output first command or second command is received by a virtual port.

In a POS system control method according to another aspect of the invention, the first operation is a printing operation for printing to the medium; and the second operation is a reading operation for reading the medium.

In a POS system control method according to another aspect of the invention, the first operation is a printing operation for printing to roll paper; and the second operation is a printing operation for printing to a slip.

Another aspect of the invention is a recording medium processing system that has: a host device including an application unit that outputs a first command that performs a first operation on a medium, or a second command that performs a second operation different from the first operation, a receiving unit that receives the first command or second command output by the application unit, a command control unit that converts the first command received by the receiving unit to a third command, and converts the second command to a fourth command, and a host communication unit that transmits the third command or fourth command output from the command control unit; and a device including a device reception unit that receives the third command or fourth command, a first operating unit that performs the first operation based on the third command, and a second operating unit that performs the second operation based on the fourth command.

In a POS system control method according to another aspect of the invention, the host device has a control unit with a kernel layer for an operating system and an application layer where the application executes; the receiving unit is a virtual port that is implemented on the kernel layer; and the command control unit operates on the application layer.

In a POS system control method according to another aspect of the invention, the first operation is a printing operation for printing to the medium; the second operation is a reading operation for reading the medium; the first operating unit is a print unit that prints on the medium; and the second operating unit is a scanner unit that scans the medium.

In a POS system control method according to another aspect of the invention, the first operation is a printing operation for printing to roll paper; the second operation is a printing operation for printing to a slip; the first operating unit is a roll paper printing unit that prints on roll paper; and the second operating unit is a slip printing unit that prints on a slip.

Other objects and features of the invention will become clear from the embodiments of the invention described below.

Advantageous Effects of Invention

By using the POS system according to the invention, plural peripheral devices can be easily replaced by a single multifunction device without changing the existing POS application program.

DESCRIPTION OF EMBODIMENTS

Figure 1:
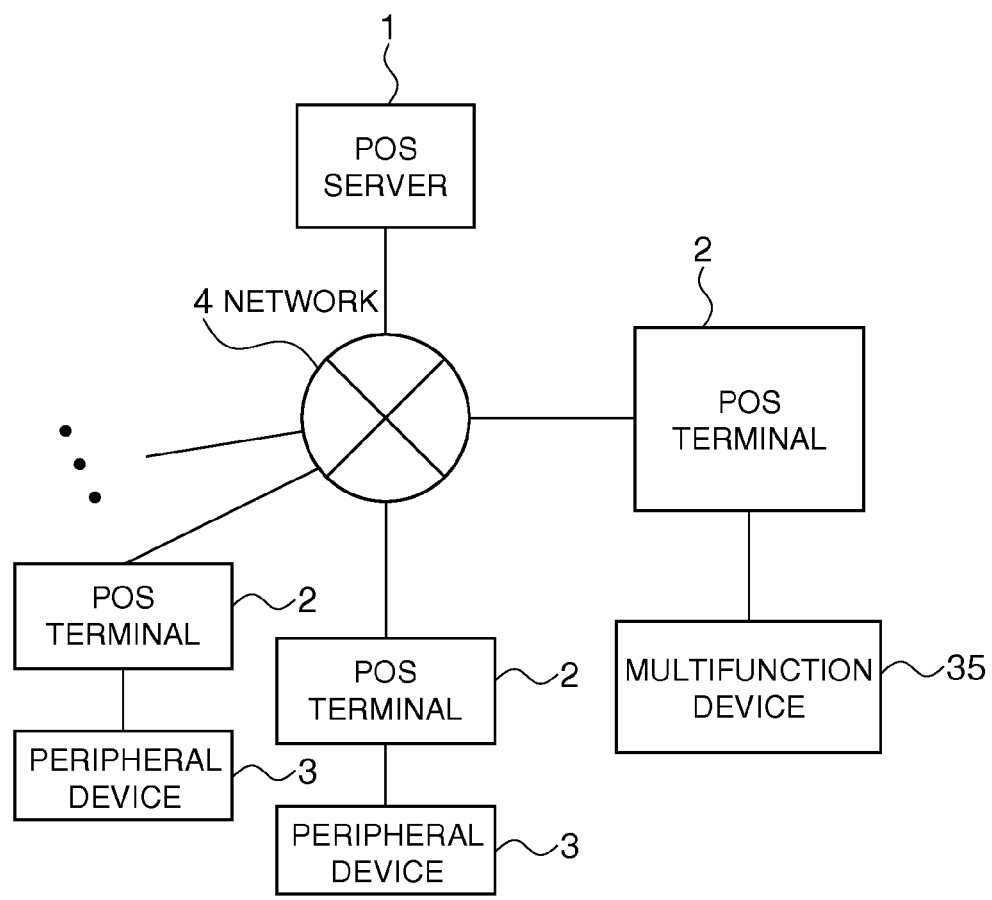
FIG. 1 shows an example of the configuration of a POS system and POS terminal device according to the invention.

Preferred embodiments of the present invention are described below with reference to the accompanying figures. The following embodiments do not, however, limit the technical scope of the invention. Note, further, that identical or like parts are referenced by like reference numerals in the accompanying figures.

Figure 2:
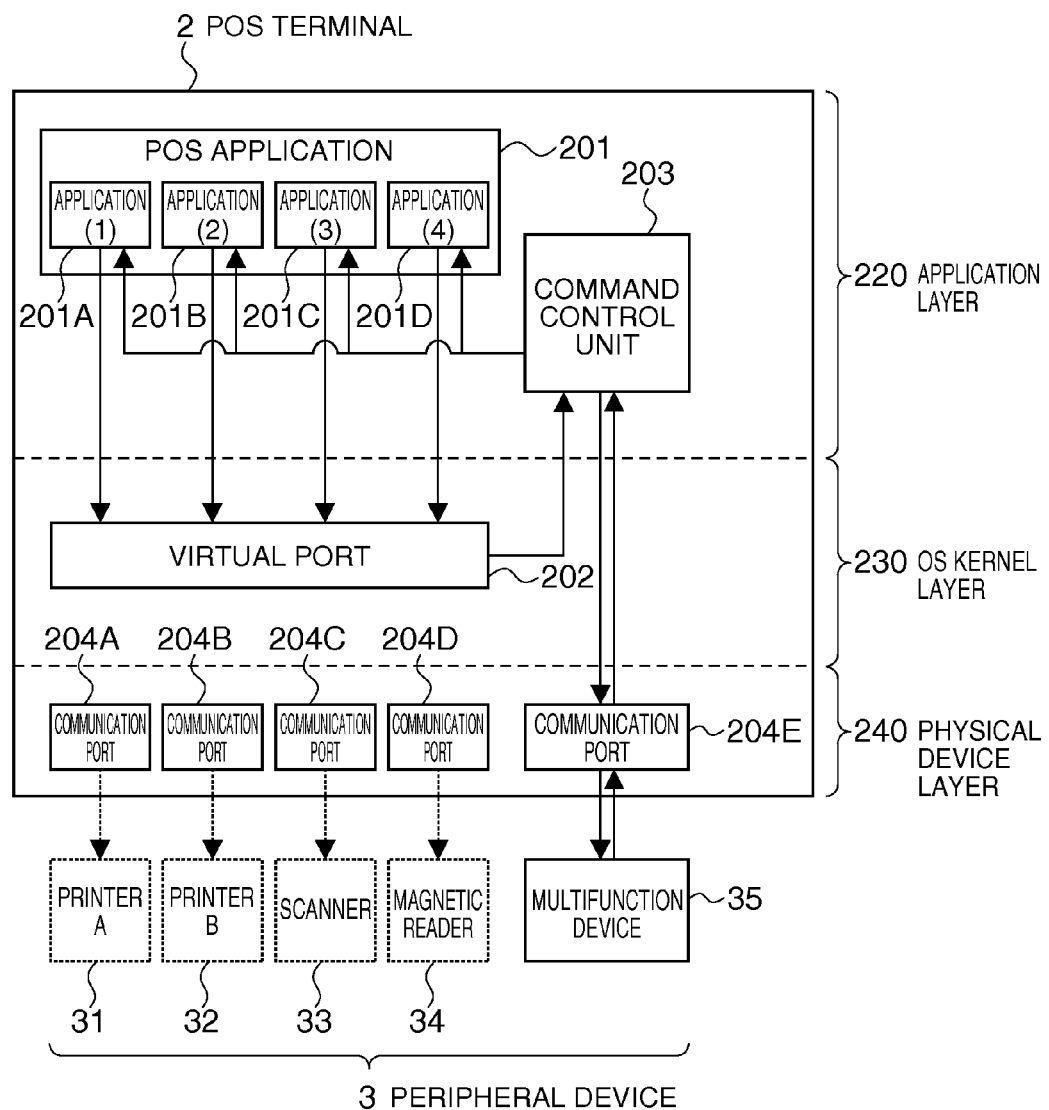
FIG. 2 is a function block diagram of the POS terminal device.

FIG. 1 shows an example of a POS terminal according to this embodiment of the invention. FIG. 2 is a function block diagram of the POS terminal device. The POS terminal 2 shown in FIG. 1 and FIG. 2 is a device that uses the invention, and acquires commands output from the POS application 201 to a plurality of peripheral devices 3 at a virtual port 202 on the OS kernel layer 230. The command control unit 203 on the application layer 220 then interprets the acquired commands, and outputs each command as a command for a multifunction device 35 that adds an operating mode of the multifunction device 35 to the communication port 204E to which the multifunction device 35 is connected. The multifunction device 35 then receives the command, and executes the command content using the added operating mode. By executing this process, the POS terminal 2 enables replacing a plurality of devices (31-34) with a single multifunction device (35) without changing the POS application 201 program.

This embodiment of the invention describes a POS system such as used in a supermarket, and as shown in FIG. 1 has a plurality of POS terminals 2 connected through a network 4 to a POS server 1. The POS server 1 is a computer system that manages the plural POS terminals 2, and runs processes to tabulate and manage data acquired from the POS terminals 2.

A POS terminal 2 is installed at each register, and is connected to a printer and other peripheral devices 3. The peripheral device 3 may be a printer that outputs receipts and coupons according to a print command output from the POS terminal 2, or a scanner that scans checks, for example, and the POS terminal 2 is positioned as the host device of the peripheral devices 3. The POS terminal 2 shown on the right in FIG. 1 is connected to a multifunction device 35 as a peripheral device, and this POS terminal 2 is described in this embodiment of the invention.

The POS terminal 2 is a computer, and while not shown in the figures includes a CPU, RAM, ROM and hard disk drive, for example. The POS application 201 program and the virtual port 202 and command control unit 203 programs described below are stored in ROM, and various processes are executed by the CPU operating according to these programs.

The functional configuration of the POS terminal 2 is as shown in FIG. 2. The POS application 201 is an existing application that was installed to the system before the system upgrade based on the invention. Before the system upgrade based on the invention, this system had four peripheral devices 3 as denoted by the dotted lines in FIG. 2, that is, printer A 31, printer B 32, scanner 33, and magnetic reader 34. Included in the POS application 201 are application (1) 201A to application (4) 201D that operate these devices by sending specific commands thereto.

Printer A 31 is, for example, a roll paper printer that outputs receipts, and application (1) 201A outputs commands for receipt printing in a form enabling processing by the printer A 31 to the communication port 204A to which the printer A 31 is connected.

Printer B 32 is, for example, a slip printer that prints an endorsement on the back of checks, and application (2) 201B outputs commands for slip printing in a form enabling processing by the printer B 32 to the communication port 204B to which the printer B 32 is connected.

Scanner 33 is, for example, a device for scanning checks, and application (3) 201C outputs scanning commands in a form enabling processing by the scanner 33 to the communication port 204C to which the scanner 33 is connected.

Magnetic reader 34 is, for example, a device for reading information from magnetically recorded portion of a check, and application (4) 201D outputs reading commands in a form enabling processing by the magnetic reader 34 to the communication port 204D to which the magnetic reader 34 is connected.

Note that each of the foregoing applications includes a driver for the corresponding device.

The POS application 201 resides on the application layer 220 enabling programs to execute processes based on the operating system (OS) of the computer.

The virtual port 202 receives the commands (the "source commands" below) output from the POS application 201 (application (1) 201A to application (4) 201D) on the OS kernel layer 230 where the operating system resides before the commands are received by the communication port 204. The virtual port 202 then forwards the received source commands The command control unit 203 converts the source commands received from the virtual port 202 to commands for the multifunction device 35, and outputs to the communication port 204E to which the multifunction device 35 is connected. During this process the command control unit 203 also determines the operating mode of the multifunction device 35 in which the multifunction device 35 performs the operation corresponding to the source command, and includes this operating mode information in the output command. More specifically, the command control unit 203 identifies the function required to execute the source command, and communicates this function information to the multifunction device 35 using a command that can be understood by the multifunction device 35. The command control unit 203 also manages starting a session based on output of this command and then ending the session based on the response from the multifunction device 35, and exclusively controls the one communication port 204E.

Note that the program related to the virtual port 202 and command control unit 203 is a program for combining devices according to the invention.

The POS terminal 2 has a plurality of communication ports 204 (204A to 204E) on the physical device layer 240, and the multifunction device 35 is connected to communication port 204E. In this example the communication ports 204 are COM ports for serial communication.

The connected multifunction device 35 is a peripheral device with the functions of the four peripheral devices 31 to 34. More specifically, the multifunction device 35 has functions for roll paper printing, slip printing, scanning, and reading magnetic information. The multifunction device 35 also has operating modes corresponding to these four functions, and operates in the appropriate mode according to the operating mode command output from the command control unit 203.

Note, further, that these four peripheral devices 31 to 34 were previously used but are not connected to the upgraded POS terminal 2. More specifically, they have already been replaced by the multifunction device 35.

Note that there are five communication ports 204 in this example, but the number of communication ports 204 is not so limited. The number of existing peripheral devices 31 to 34, and the number of functions provided by the multifunction device 35, are also not limited to four.

Figure 3:
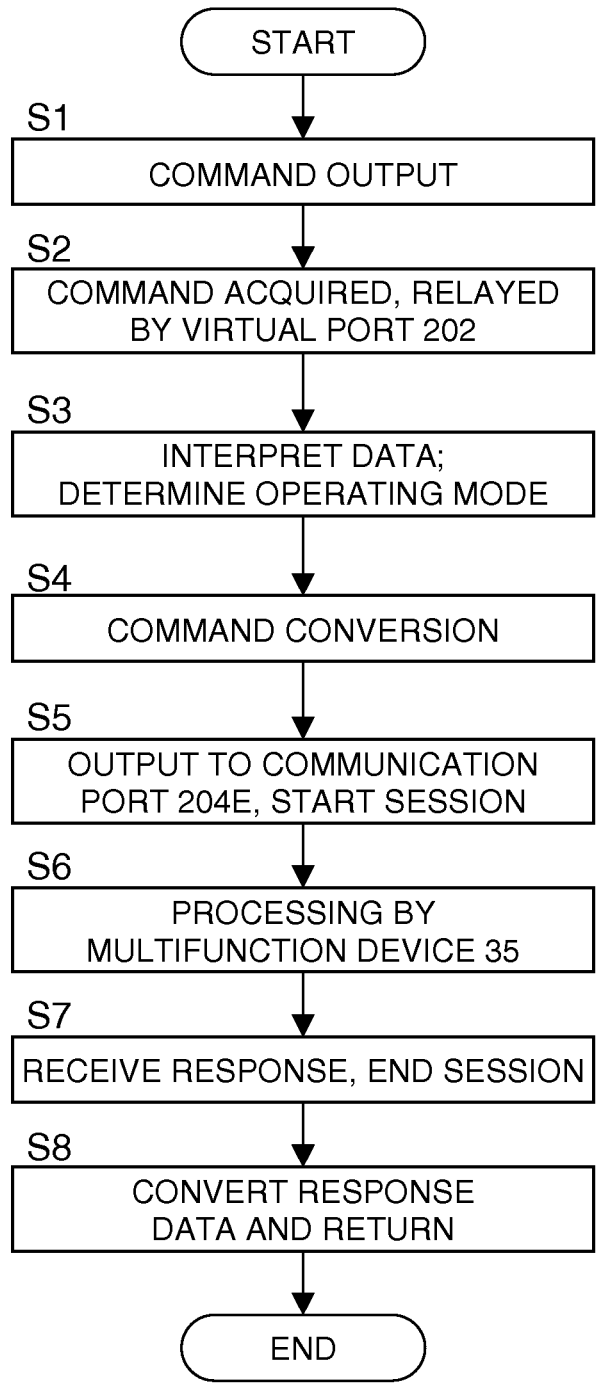
FIG. 3 is a flow chart showing an example of the steps in the command output process.

A feature of the POS terminal 2 configured as described above is in the process performed when the POS application 201 sends commands to the peripheral devices 3, and an example of this process is described below. FIG. 3 is a flow chart of steps in this process.

A command is first output from an application included in the POS application 201 to one of the communication ports 204 (step S1). For example, a command to output a receipt is sent from application (1) 201A to communication port 204A, or a command to scan a check is output from application (3) 201C to communication port 204C. In other words, because the POS application 201 was installed to the existing system before upgrading as described above, the POS application 201 outputs commands to peripheral devices 3 as though the peripheral devices 31 to 34 previously installed to the existing system are still there.

The output command is then received by the virtual port 202 before reaching the communication port 204 to which the command was output (step S2). This process is executed by first changing the registry (priority) settings so that data output to any communication port 204 is first received by the virtual port 202, and these registry settings are implemented when the OS boots up. The received source command is then sent from the virtual port 202 to the command control unit 203 of the application layer 220 (step S2).

The command control unit 203 then interprets the sent source command, and determines the operating mode of the multifunction device 35 used to execute the command (step S3). More specifically, the command control unit 203 determines the existing peripheral device 31 to 34 to which the source command was output from the output communication port 204 information, for example, and selects the operating mode of the multifunction device 35 corresponding to the function of that peripheral device. For example, if the source command was output to communication port 204A, the operating mode of the multifunction device corresponding to the function of printer A 31, that is, a roll paper printing function, is selected.

The command control unit 203 then applies a command conversion process to the source command (step S4). As described above, because the source command is output through the driver of each application and is written in a command format specific to the previously existing peripheral device, the command can be converted to a command format that can be understood by the multifunction device 35. For example, if the source command was output to the scanner 33, the scanner command is converted to a corresponding command for the multifunction device 35.

The command control unit 203 adds information about the selected operating mode to the converted command, and in this example is information related to a roll paper printing function.

The command control unit 203 then outputs the converted command to the communication port 204E, and stores the start of a session in RAM (step S5) in order to exclusively control the single communication port 204E that is used. Until the session that was started ends, the command control unit 203 does not start a session using the communication port 204E by means of another command. In other words, other commands are not output to communication port 204E until the first session ends. For example, after a receipt printing command that uses the receipt printing operating mode is output to the communication port 204E, another command, such as a scanning command, is not output to the multifunction device 35 until there is a response from the multifunction device 35.

The converted command is then sent through the communication port 204E to the multifunction device 35, and the process directed by the command is performed by the multifunction device 35 (step S6). More specifically, the multifunction device 35 changes to the operating mode indicated by the operating mode information contained in the converted command, and performs the process according to the command content. For example, if the received command requires printing a receipt, operation changes to the roll paper printing mode and a receipt is printed and output according to the command content. If the received command requires scanning a check, the scanning mode is selected, operation waits until the check is inserted to the specific scanning position, and the inserted check is then scanned.

When the process is completed, the multifunction device 35 returns a response (signal) indicating that the process required by the command ended through the communication port 204E to the command control unit 203.

Upon receiving the response, the command control unit 203 ends the session that was started, and stores in RAM an indication that a new session can be started using communication port 204E (step S7). This enables outputting to the communication port 204E based on a new source command.

The command control unit 203 then converts the received response to a data format that can be understood by the driver of the application that output the source command, that is, converts the response to the same data format as a response returned from the previously existing peripheral device to which the source command was output, and returns the converted response to the application that output the source command (step S8).

The returned response is then received by the application and processed in the same way as in the existing system.

Command processes in this POS terminal 2 are thus processed as described above. More specifically, commands output from the POS application 201 to existing peripheral devices 31 to 34 are processed by a single multifunction device 35.

Note that the foregoing embodiment assumes that command requests output from the POS application 201 are passed directly to the multifunction device 35, but the command content passed to the multifunction device 35 could be changed. For example, when the print data for a receipt output from the POS application 201 to the printer A 31, which is a monochrome printer, is output to a multifunction device 35 capable of color printing for printing a receipt with color, the command control unit 203 could process the data to add color information to the source command.

In this case, the command control unit 203 identifies a print object to which color is to be added according to predetermined rules when interpreting the command, and executes a data process that adds information to the print command for that object. The print command to which this process is applied is then output as described above to the communication port 204E after command conversion.

Changing command content is not limited to adding color information, and could include inserting a new image when printing (such as adding a logo to a receipt). These changes can be achieved by the command control unit 203 performing a similar data processing operation.

As described above, a POS terminal 2 according to this embodiment of the invention can collectively process commands output from a POS application 201 as commands for a multifunction device 35 that combines the functions of plural peripheral devices. A POS terminal and POS system having a plurality of peripheral devices 31 to 34 can thus be upgraded to the POS terminal 2 described above and a POS system including the same using a relatively simple method. In other words, a plurality of peripheral devices can be replaced with a single multifunction device having the same functions.

Figure 4:
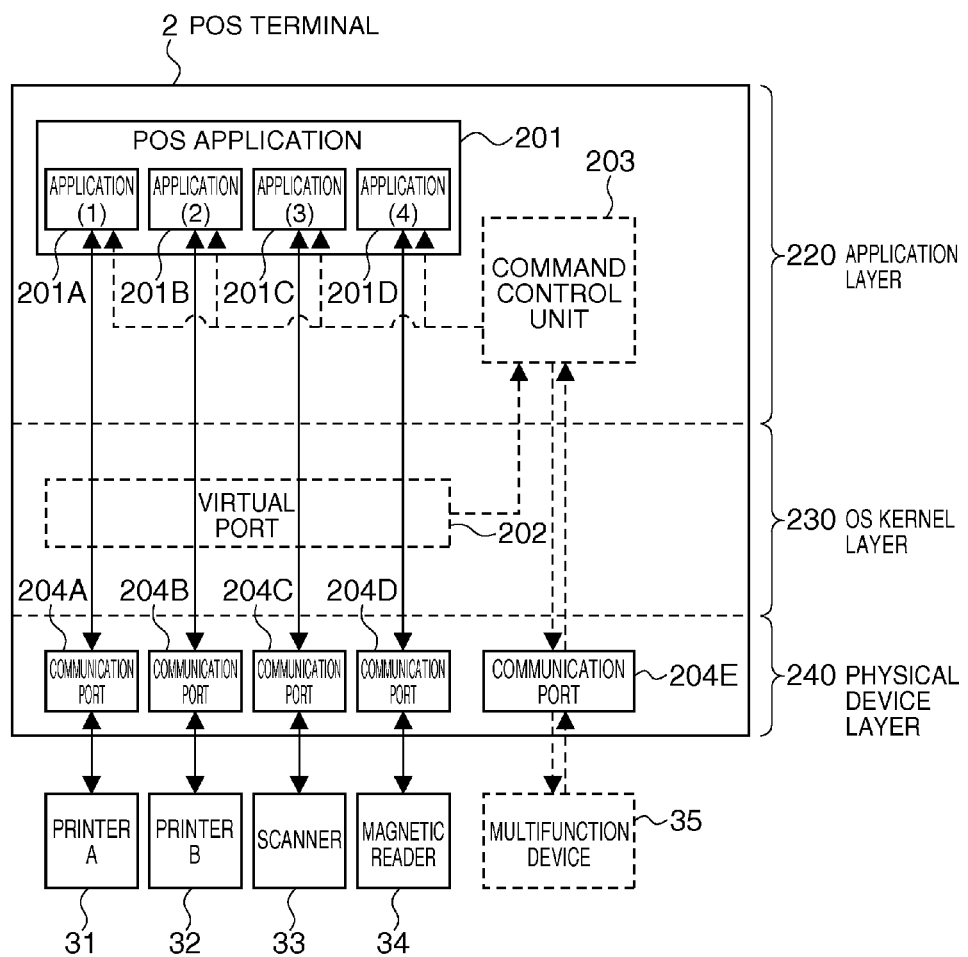
FIG. 4 describes an improvement of the POS system.

FIG. 4 shows another embodiment of the invention. The components of this embodiment are the same as shown in FIG. 2 with the solid lines denoting the existing POS terminal and POS system. More specifically, before the system is upgraded, commands output from the POS application 201 (applications (1) to (4)) are received by communication ports 204 (A-D) corresponding to the output commands, and processes are performed by the peripheral devices 31 to 34 corresponding to the commands. The POS terminal 2 described above and POS system including the POS terminal 2 can be achieved by adding the parts denoted by dotted lines in the figure to the existing system.

More specifically, by adding the foregoing virtual port 202, command control unit 203, and multifunction device 35, the plural peripheral devices of the existing POS system can be replaced by a multifunction device without changing the existing POS application 201 (applications (1) to (4)). This upgrade (change) can be done by installing a new multifunction device 35 and installing driver software, including a program and data for the added portions, for the multifunction device.

As described above, by using a program for combining devices according to this embodiment of the invention, a plurality of peripheral devices can be easily replaced with a single multifunction device without changing the existing POS application program.

In addition, because the communication port to which the multifunction device is connected is controlled exclusively, source commands directed to plural devices can be processed with no problem.

Furthermore, because the command control unit 203 is installed to the application layer, the functions provided by this part can be easily developed.

In addition, by performing a process that changes command content according to the command process, POS application functions can be expanded without changing the POS application program.

Note also that while the POS server 1 is connected to plural POS terminals 2 in the embodiment described above, the invention is not so limited and can be adapted to an environment in which a POS terminal and peripheral devices are connected.

The foregoing embodiment of the invention describes a POS system, for example, but the invention is not limited to POS systems and can be applied to other types of systems having an application that controls processing by peripheral devices, including systems used in hospitals and shipping companies, for example, and the invention is particularly useful when modifying an existing application program is difficult.

The POS application program and programs for command processing are stored in ROM in the foregoing embodiment by way of example, but storing these programs is not limited to ROM devices, and RAM, a hard disk drive, or other storage media can be used. The programs can also be stored on separate storage media.

The scope of the invention is not limited to the foregoing embodiments, and includes the invention described in the accompanying claims and equivalents thereof.

Industrial Applicability

The invention is not limited to use with POS systems, and can be applied to other types of systems having an application that controls processing by peripheral devices, including systems used in hospitals and shipping companies, for example, and the invention is particularly useful when modifying an existing application program is difficult.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

Reference Signs List

1 POS server, 2 POS terminal, 3 Peripheral device, 4 Network, 31 Printer A, 32 Printer B, 33 Scanner, 34 Magnetic reader, 35 Multifunction device, 201 POS application, 202 Virtual port, 203 Command control unit, 204 Communication port, 220 Application layer 230 OS kernel layer, 240 Physical device layer

The invention claimed is:

1. A POS system comprising:
a host device including
an application unit that outputs a first command that performs a first operation on a medium to a first communication port, or a second command that performs a second operation different from the first operation to a second communication port,
a receiving unit that receives the first command or second command output by the application unit, the first command or the second command being received by the receiving unit before being received by the first communication port or the second communication port,
a command control unit that converts the first command received by the receiving unit to a third command, or converts the second command to a fourth command, and
a host communication unit that transmits the third command or fourth command output from the command control unit to a third communication port; and
a device including
a device communication unit that receives the third command or fourth command,
a first operating unit that performs the first operation based on the third command, and
a second operating unit that performs the second operation based on the fourth command.

2. The POS system described in claim 1, wherein:
the host device has a control unit with a kernel layer for an operating system and an application layer where the application executes;
the receiving unit is a virtual port that is implemented on the kernel layer, the receiving unit transmitting the first command or the second command to the application layer; and
the command control unit operates on the application layer.

3. The POS system described in claim 1, wherein:
the command control unit adds first operation information to the third command when converting the first command, and adds second operation information to the fourth command when converting the second command.

4. The POS system described in claim 3, wherein:
the device includes a selection unit that selects the first operating unit based on the first operation information added to the third command, or selects the second operating unit based on the second operation information added to the fourth command.

5. The POS system described in claim 1, wherein:
the device communication unit sends a signal reporting the end of the first operation of the first operating unit based on the transmitted third command, or the end of the second operation of the second operating unit based on the transmitted fourth command; and
the host communication unit receives the signal sent from the device communication unit.

6. The POS system described in claim 5, wherein:
the host communication unit does not send the fourth command to the device communication unit after sending the third command until the signal transmitted from the device communication unit is received.

7. The POS system described in claim 1, wherein:
when converting the first command to the third command, the command control unit changes and converts the first operation instruction contained in the first command to the third command.

8. The POS system described in claim 1, wherein:
the first operation is a printing operation for printing to the medium;
the second operation is a reading operation for reading the medium;
the first operating unit is a print unit that prints on the medium; and
the second operating unit is a scanner unit that scans the medium.

9. The POS system described in claim 1, wherein:
the first operation is a printing operation for printing to roll paper;
the second operation is a printing operation for printing to a slip;
the first operating unit is a roll paper printing unit that prints on roll paper; and
the second operating unit is a slip printing unit that prints on a slip.

10. The POS system described in claim 1, further comprising:
a POS server that manages the host device over a network.

11. A POS system control method, comprising steps of:
an application outputting a first command that performs a first operation on a recording medium to a first communication port, or a second command that performs a second operation different from the first operation to a second communication port,
receiving, by a receiving unit the output first command or second command, the first command or the second command being received before being received by the first communication sort or the second communication sort,
converting the first command to a third command when the first command is received by the receiving unit, or
converting the second command to a fourth command when a second command is received by the receiving unit, and
transmitting the converted third command or fourth command to a third communication port;
the device performing the first operation when the third command is received, and
performing the second operation when the fourth command is received.

12. The POS system control method described in claim 11, wherein:
the receiving unit is a virtual port.

13. The POS system control method described in claim 11, wherein:
the first operation is a printing operation for printing to the medium; and
the second operation is a reading operation for reading the medium.

14. The POS system control method described in claim 11, wherein:
the first operation is a printing operation for printing to roll paper; and
the second operation is a printing operation for printing to a slip.

15. A non-transitory medium processing system comprising:
a host device including
an application unit that outputs a first command that performs a first operation on a medium to a first communication port, or a second command that performs a second operation different from the first operation to a second communication port,
a receiving unit that receives the first command or second command output by the application unit, the first command or the second command being received by the receiving unit before being received by the first communication port or the second communication port,
a command control unit that converts the first command received by the receiving unit to a third command, or converts the second command to a fourth command, and
a host communication unit that transmits the third command or fourth command output from the command control unit to a third communication port; and
a device including
a device reception unit that receives the third command or fourth command,
a first operating unit that performs the first operation based on the third command, and
a second operating unit that performs the second operation based on the fourth command.

16. The recording medium processing system described in claim 15, wherein:
the host device has a control unit with a kernel layer for an operating system and an application layer where the application executes;
the receiving unit is a virtual port that is implemented on the kernel layer the receiving unit transmitting the first command or the second command to the application layer; and
the command control unit operates on the application layer.

17. The recording medium processing system described in claim 15, wherein:
the first operation is a printing operation for printing to the medium;
the second operation is a reading operation for reading the medium;
the first operating unit is a print unit that prints on the medium; and
the second operating unit is a scanner unit that scans the medium.

18. The recording medium processing system described in claim 15, wherein:
the first operation is a printing operation for printing to roll paper;
the second operation is a printing operation for printing to a slip;
the first operating unit is a roll paper printing unit that prints on roll paper; and
the second operating unit is a slip printing unit that prints on a slip.

* * * * *